(12) United States Patent
Schimunek

(10) Patent No.: US 6,860,536 B1
(45) Date of Patent: Mar. 1, 2005

(54) SLIDABLE TRUCK BED-SUPPORTED CARGO CARRIER ASSEMBLY

(76) Inventor: Kerry W. Schimunek, 585 Sabre Road, Site 5 Box 1 Comp 7, British Columbia (CA), V0P 1R0

( * ) Notice: Subject to any disclaimer, the term of this patent is extended or adjusted under 35 U.S.C. 154(b) by 28 days.

(21) Appl. No.: 10/286,289

(22) Filed: Nov. 4, 2002

(51) Int. Cl.[7] .......................... B60R 13/01; B62D 33/02
(52) U.S. Cl. .................. 296/26.09; 296/37.6; 296/39.2
(58) Field of Search .......................... 296/26.01, 26.08, 296/26.09, 37.6, 39.2, 181, 182, 183

(56) References Cited

U.S. PATENT DOCUMENTS

| | | | | |
|---|---|---|---|---|
| D257,966 S | * | 1/1981 | Page | D12/221 |
| 4,618,308 A | * | 10/1986 | Ballard | 414/532 |
| 4,629,390 A | * | 12/1986 | Burke | 414/527 |
| 4,681,360 A | * | 7/1987 | Peters et al. | 296/37.6 |
| 4,705,315 A | * | 11/1987 | Cherry | 296/37.1 |
| 4,733,898 A | * | 3/1988 | Williams | 296/24.1 |
| 4,909,558 A | * | 3/1990 | Roshinsky | 296/37.6 |
| 4,950,123 A | * | 8/1990 | Brockhaus | 414/522 |
| 4,993,088 A | * | 2/1991 | Chudik | 5/118 |
| 5,052,878 A | * | 10/1991 | Brockhaus | 414/522 |
| 5,064,335 A | * | 11/1991 | Bergeron et al. | 414/522 |
| 5,513,941 A | * | 5/1996 | Kulas et al. | 414/522 |
| 5,649,731 A | * | 7/1997 | Tognetti | 296/26.09 |
| 5,820,190 A | * | 10/1998 | Benner | 296/26.09 |
| 5,829,945 A | * | 11/1998 | Stanley | 414/477 |
| 5,934,725 A | * | 8/1999 | Bowers | 296/26.09 |
| 5,938,262 A | * | 8/1999 | Mills | 296/26.09 |
| 6,065,792 A | * | 5/2000 | Sciullo et al. | 296/26.09 |
| 6,390,525 B2 | * | 5/2002 | Carpenter et al. | 296/26.09 |
| 6,659,524 B1 | * | 12/2003 | Carlson | 296/26.09 |
| 2002/0140245 A1 | * | 10/2002 | Coleman et al. | 296/26.09 |
| 2002/0153736 A1 | * | 10/2002 | Goodyear | 296/26.01 |
| 2003/0146636 A1 | * | 8/2003 | Keller | 296/26.09 |

* cited by examiner

Primary Examiner—D. Glenn Dayoan
Assistant Examiner—Paul Chenevert

(57) ABSTRACT

A slidable truck bed-supported cargo carrier assembly for facilitating the loading and unloading of items and objects from truck boxes. The slidable truck bed-supported cargo carrier assembly includes a base support assembly including a base support frame being adapted to rest upon a floor of a truck box, and also including roller assemblies being attached to base support frame; and also includes a deck support frame being slidably disposed upon the base support assembly; and further includes a deck being mounted upon the deck support frame; and also includes a locking assembly for securing the deck support frame to the base support frame.

7 Claims, 5 Drawing Sheets

SLIDABLE TRUCK BED-SUPPORTED CARGO CARRIER ASSEMBLY

BACKGROUND OF THE INVENTION

1. Field of the Invention

The present invention relates to slidable truck beds and more particularly pertains to a new slidable truck bed-supported cargo carrier assembly for facilitating the loading and unloading of items and objects from truck boxes.

2. Description of the Prior Art

The use of slidable truck beds is known in the prior art. More specifically, slidable truck beds heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 5,513,941; U.S. Pat. No. 5,938,262; U.S. Pat. No. 5,052,878; U.S. Pat. No. 6,065,792; U.S. Pat. No. 4,950,123; and U.S. Pat. No. Des. 257,966.

While these devices fulfill their respective, particular objectives and requirements, the aforementioned patents do not disclose a new slidable truck bed-supported cargo carrier assembly. The prior art includes frames being supported upon truck beds and also includes sheets of material movably supported upon the frames.

SUMMARY OF THE INVENTION

The general purpose of the present invention, which will be described subsequently in greater detail, is to provide a new slidable truck bed-supported cargo carrier assembly which has many of the advantages of the slidable truck beds mentioned heretofore and many novel features that result in a new slidable truck bed-supported cargo carrier assembly which is not anticipated, rendered obvious, suggested, or even implied by any of the prior art slidable truck beds, either alone or in any combination thereof. The present invention includes a base support assembly including a base support frame being adapted to rest upon a floor of a truck box, and also including roller assemblies being attached to base support frame; and also includes a deck support frame being slidably disposed upon the base support assembly; and further includes a deck being mounted upon the deck support frame; and also includes a locking assembly for securing the deck support frame to the base support frame. None of the prior art includes the combination of the elements of the present invention.

There has thus been outlined, rather broadly, the more important features of the slidable truck bed-supported cargo carrier assembly in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

It is an object of the present invention to provide a new slidable truck bed-supported cargo carrier assembly which has many of the advantages of the slidable truck beds mentioned heretofore and many novel features that result in a new slidable truck bed-supported cargo carrier assembly which is not anticipated, rendered obvious, suggested, or even implied by any of the prior art slidable truck beds, either alone or in any combination thereof.

Still another object of the present invention is to provide a new slidable truck bed-supported cargo carrier assembly for facilitating the loading and unloading of items and objects from truck boxes.

Still yet another object of the present invention is to provide a new slidable truck bed-supported cargo carrier assembly that is easy and convenient to use.

Even still another object of the present invention is to provide a new slidable truck bed-supported cargo carrier assembly that makes it easier for the user to reach objects placed on the bed of the truck box.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
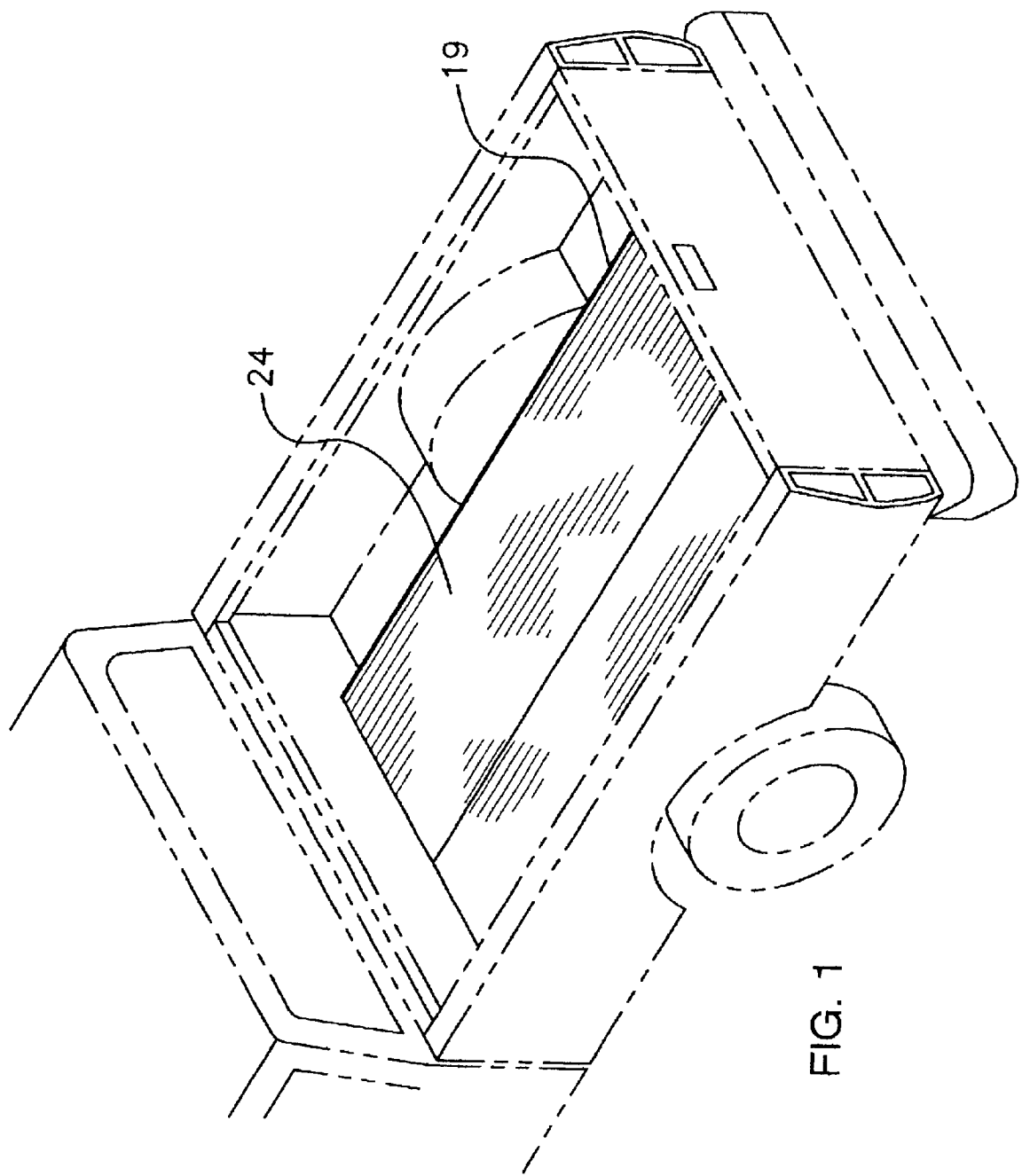
FIG. 1 is a perspective view of a new slidable truck bed-supported cargo carrier assembly according to the present invention.
Figure 2:
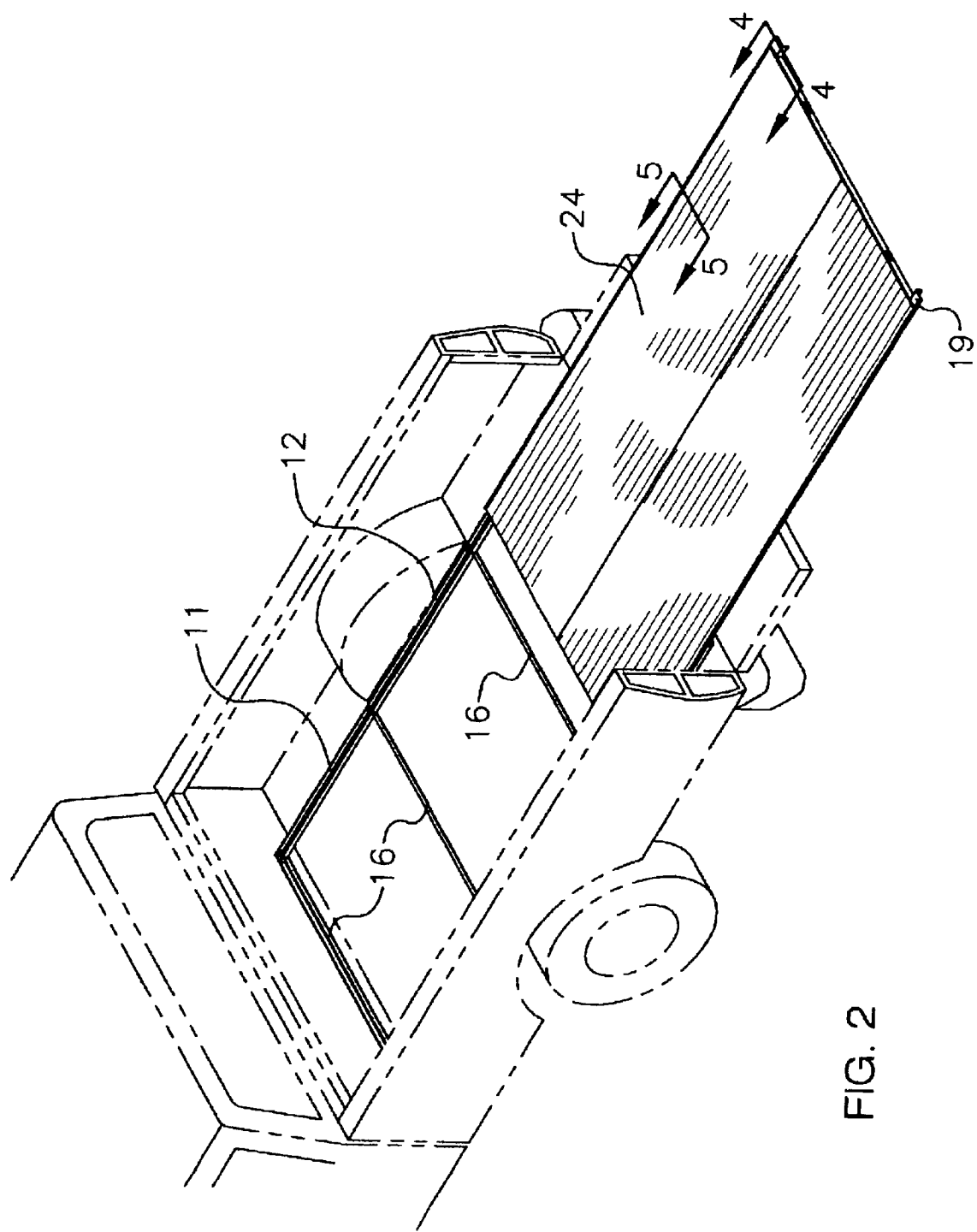
FIG. 2 is another perspective view of the present invention.
Figure 3:
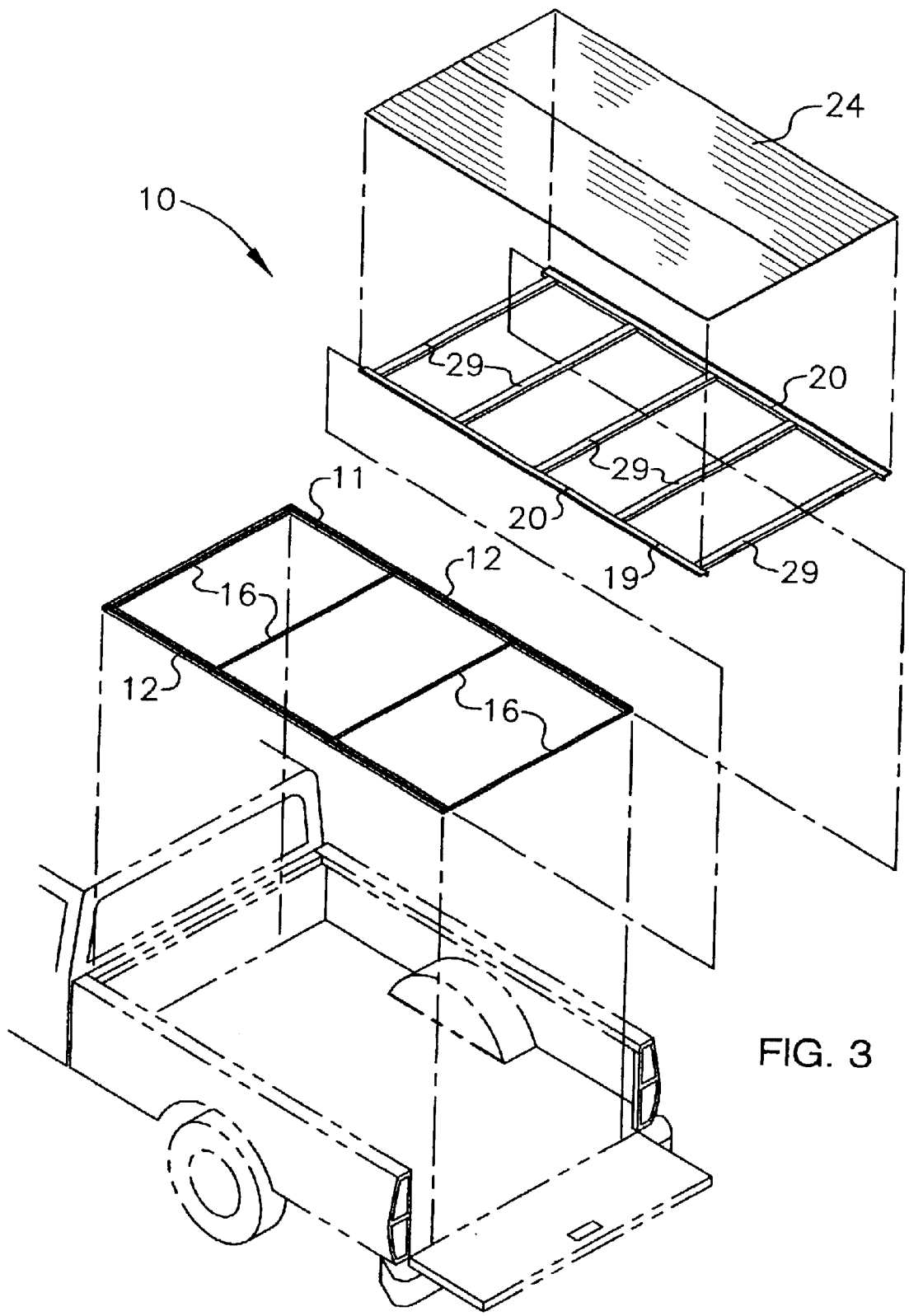
FIG. 3 is an exploded perspective view of the present invention.
Figure 4:
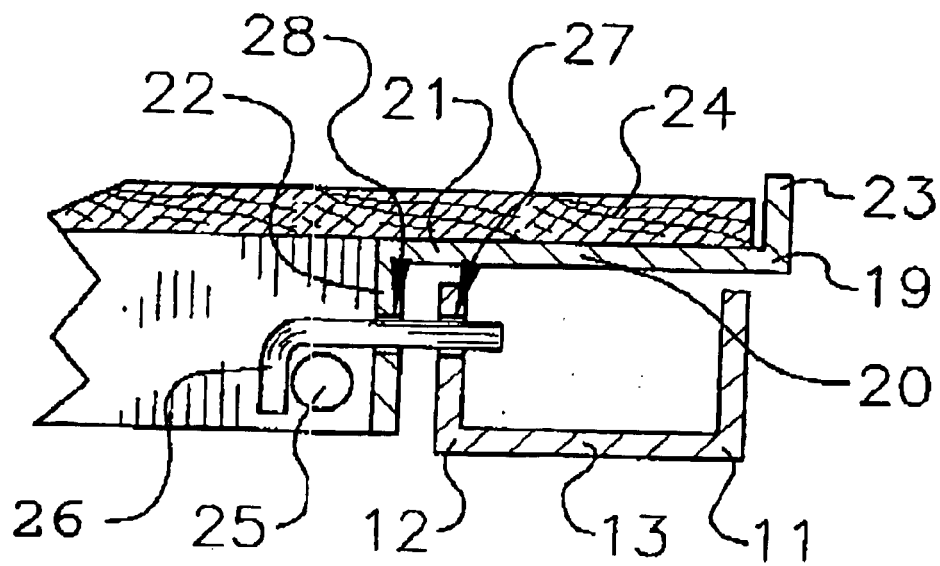
FIG. 4 is a partial cross-sectional view of the present invention.
Figure 5:
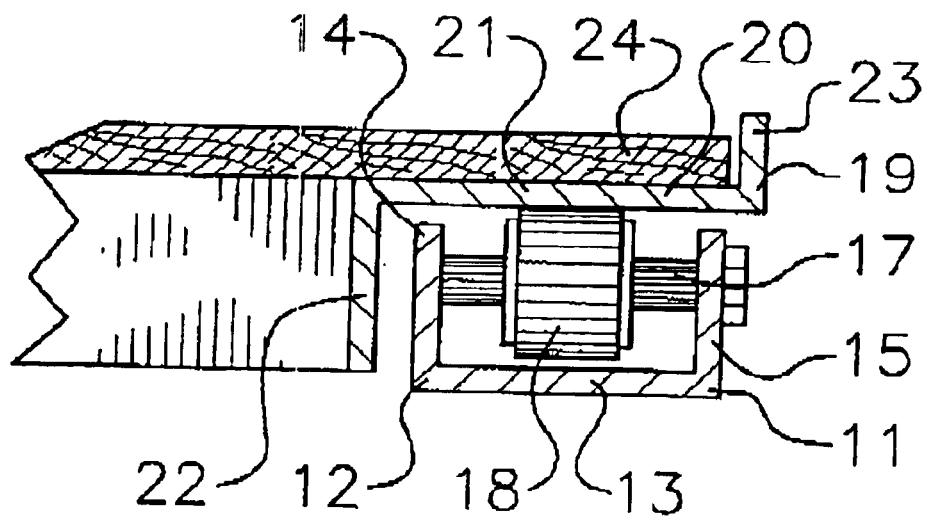
FIG. 5 is another partial cross-sectional view of the present invention.
Figure 6:
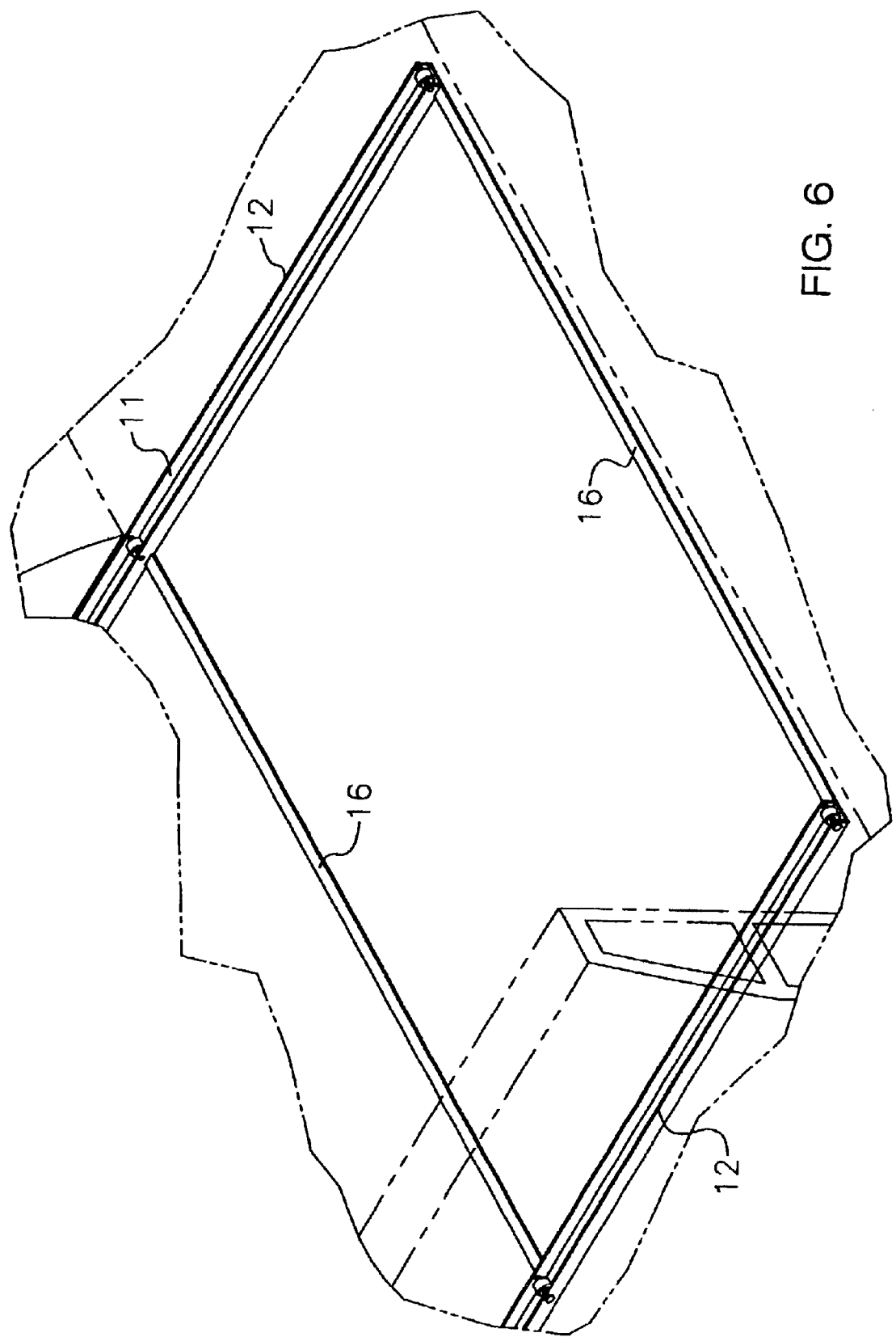
FIG. 6 is a perspective view of the base support assembly of the present invention.

With reference now to the drawings, and in particular to FIGS. 1 through 6 thereof, a new slidable truck bed-supported cargo carrier assembly embodying the principles and concepts of the present invention and generally designated by the reference numeral 10 will be described.

As best illustrated in FIGS. 1 through 6, the slidable truck bed-supported cargo carrier assembly 10 generally comprises a base support assembly including a base support frame 11 being adapted to rest upon a floor of a truck box, and also including roller assemblies being conventionally attached to the base support frame 11. The base support frame 11 includes elongate side members 12 being spaced apart and being adapted to be fastened to the floor of the truck box, and also includes cross members 16 being attached to the elongate side members 12 for stabilizing the elongate side members 12. Each of the elongate side members 12 has a U-shaped lateral cross-section which includes an elongate main portion 13 and longitudinal end portions 14,15 which are angled relative to the elongate main portion 13 thus forming a channel. Each of the roller assemblies includes a shaft 17 being conventionally disposed in the channel of a respective elongate side member 12, and also includes a roller member 18 being rotatably mounted to the shaft 17. The shaft 17 has ends which are journaled in the longitudinal end portions 14,15 of the elongate side member 12.

A deck support frame 19 is slidably and conventionally disposed upon the base support assembly. The deck support frame 19 includes elongate side support members 20 being spaced apart and being slidably mounted upon the roller members 18, and also includes cross support members 29 being conventionally attached to the elongate side support members 20. Each of the elongate side support members 20 includes a longitudinal main planar portion 21 being movably disposed upon the roller members 18, and also includes a first longitudinal end portion 22 being downwardly angled relative to the longitudinal main planar portion 21 and being disposed adjacent to a respective elongate side member 12, and further includes a second longitudinal end portion 23 being upwardly angled to the longitudinal main planar portion 21.

A deck 24 is conventionally mounted upon the deck support frame 19. The deck 24 is a rigid sheet of material and is disposed upon the deck support frame 19 and is disposed between and retained by the second longitudinal end portions 23.

A locking assembly for securing the deck support frame 19 to the base support frame 11 includes at least one pin support member 25 being conventionally attached to the deck support frame 19, and also includes at least one pin member 26 being removably disposed through holes 27,28 in the elongate side members 12 of the base support frame 11 and the elongate side support members 20 of the deck support frame 19 for securing the deck support frame 19 to the base support frame 11.

In use, the user grasp the deck 24 and slides the deck 24 and the deck support frame 19 upon the roller members 18 out the back end of the truck box and either removes cargo placed on the deck 24 or loads cargo onto the deck 24, and then slides the deck 24 and the deck support frame 19 back onto the bed of the truck box and inserts the pin member 26 in the hole 27 of the elongate side member 12.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the slidable truck bed-supported cargo carrier assembly. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A slidable truck bed-supported cargo carrier assembly comprising:

a base support assembly including a base support frame being adapted to rest upon a floor of a truck box, and also including roller assemblies being attached to base support frame, said base support frame including elongate side members being spaced apart and being adapted to be fastened to the floor of the truck box, and also including cross members being attached to said elongate side members for stabilizing said elongate side members, each of said elongate side members having a U-shaped lateral cross-section which includes an elongate main portion and longitudinal end portions which are angled relative to said elongate main portion thus forming a channel;

a deck support frame being slidably disposed upon said base support assembly;

a deck being mounted upon said deck support frame; and a locking assembly for securing said deck support frame to said base support frame.

2. A slidable truck bed-supported cargo carrier assembly as described in claim 1, wherein each of said roller assemblies includes a shaft being disposed in said channel of a respective said elongate side member, and also includes a roller member being rotatably mounted to said shaft.

3. A slidable truck bed-supported cargo carrier assembly as described in claim 2, wherein said shaft has ends which are journaled in said longitudinal end portions of said elongate side member.

4. A slidable truck bed-supported cargo carrier assembly as described in claim 3, wherein said deck support frame includes elongate side support members being spaced apart and being slidably mounted upon said roller members, and also includes cross support members being attached to said elongate side support members.

5. A slidable truck bed-supported cargo carrier assembly as described in claim 4, wherein each of said elongate side support members includes a longitudinal main planar portion being movably disposed upon said roller members, and also includes a first longitudinal end portion being downwardly angled relative to said longitudinal main planar portion and being disposed adjacent to a respective said elongate side member, and further includes a second longitudinal end portion being upwardly angled to said longitudinal main planar portion.

6. A slidable truck bed-supported cargo carrier assembly as described in claim 5, wherein said deck is a rigid sheet of material and is disposed upon said deck support frame and is disposed between and retained by said second longitudinal end portions.

7. A slidable truck bed-supported cargo carrier assembly as described in claim 6, wherein said locking assembly includes at least one pin support member being attached to said deck support frame, and also includes at least one pin member being removably disposed through holes in said elongate side members of said base support frame and said elongate side support members of said deck support frame for securing said deck support frame to said base support frame.

* * * * *